(12) United States Patent
Yamamoto

(10) Patent No.: US 6,226,070 B1
(45) Date of Patent: May 1, 2001

(54) IMAGE PROCESSING METHOD

(75) Inventor: Hiroyasu Yamamoto, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/335,756

(22) Filed: Jun. 18, 1999

(30) Foreign Application Priority Data

Jun. 18, 1998 (JP) .................................................. 10-170961

(51) Int. Cl.[7] ........................... G03B 27/52; G03B 27/32; H04N 1/21

(52) U.S. Cl. ................................ 355/40; 355/77; 358/302

(58) Field of Search .................................. 355/18, 40, 77; 340/146.2; 365/127; 348/96; 358/302

Primary Examiner—Russell Adams
Assistant Examiner—Peter B. Kim
(74) Attorney, Agent, or Firm—Birch, Stewart, Kolasch & Birch, LLP

(57) ABSTRACT

When a photographing format is unable to be detected, the image processing method preliminarily calculates and then stores the image processing conditions of the image of interest corresponding to all of the photographing formats, determines the photographing format of the image of interest while the image of interest is being represented on a monitor, and thereafter, represents on the monitor again the image subjected to image processing under the image processing conditions corresponding to the thus determined photographing format selected from among the preliminary stored image processing conditions of the image of interest corresponding to all of the photographing formats. The image processing method is capable of efficiently performing image processing under image processing conditions corresponding to a correct photographing format, even when detection of the photographing format resulted in failure.

12 Claims, 7 Drawing Sheets

IMAGE PROCESSING METHOD

BACKGROUND OF THE INVENTION

The present invention relates to an image processing method for determining the optimum image processing conditions of a plurality of images recorded on a photographic film having at least two different photographing formats in accordance with respective photographing formats.

Heretofore, the images recorded on photographic films such as negatives and reversals (hereinafter called as film) have been commonly printed on light-sensitive materials (photographic paper) by means of direct exposure employing an analog photoprinter in which the film image is projected onto the light-sensitive material to achieve its areal exposure.

A new technology has recently been introduced and this is a printer that relies upon digital exposure. Briefly, image information recorded on a film is read photoelectrically, converted to digital data and subjected to various image processing operations; the thus processed digital data of the image information exposes a light-sensitive material digitally. The printer operating on this principle has been commercialized as a digital photoprinter.

In the digital photoprinter, images can be processed as digital image data so that exposure conditions at the time of printing can be determined. Accordingly, the digital photoprinter is capable of performing effective image processing operations such as the correction of washed-out highlights or flat (dull) shadows due to taking of pictures with backlight, an electronic flash or the like, sharpness (sharpening) processing and the correction of color failure, correction of density failure, correction of under- or over-exposure, correction of marginal lumination shortage. Such image processing operations of the digital photoprinter enable to produce high-quality prints that have been impossible to achieve by the conventional analog photoprinter.

In photographing the images (subjects) using an ordinary film of 135 size, a plurality of different photographing formats are provided. They are, for example, a standard size (C type), a high-vision size (H type), a panorama size (P type) and the like. A photographer can decide freely any photographing format at the time of taking pictures whereupon an image is recorded only in a region corresponding to each of photographing formats within respective frames; hence, the image recorded only in the region corresponding to each of the photographing formats can be printed.

As described above, in the film at least two kinds of different photographing formats may be mingled each other in a random manner. Moreover, since information on the photographing format is not recorded on the aforementioned film of 135 size or the like, the photographing format has to date been automatically detected frame by frame and, thereafter, image processing conditions have been calculated based on the thus detected photographing format. Finally, image processing has been performed under the thus calculated image processing conditions to produce finished prints.

However, some cases appear where the photographing formats are wrongly detected or can not be detected at all depending on photographed images. In such cases, that is, detection failures of the photographing format, an operator who is to perform verification looking at a picture (image) represented on a monitor before printing is started enters a command for a correct photographing format as required; the image in a frame of which the photographing format is changed is read again to calculate the image processing conditions all over again.

However, in the above described method, for example, at an apparatus which performs steps below: a plurality of images of either in one unit of a film or in specified number of frames are consecutively read; photographing formats are detected to calculate image processing conditions corresponding to the respective images; the individual images are subjected to the specified image processing conditions in accordance with the thus calculated image processing conditions; and, thereafter, a plurality of processed images are represented on the monitor either as a whole or on a frame basis to verify the processed images, the operator comes to notice the detection failure of the photographing formats only when images are represented on the monitor for verification.

Therefore, when the operator noticed the detection failure of the photographing formats by looking at images represented on the monitor, for example, in a case where the analog photoprinter is used, it is needed to verify the images again in a way that relies on the following steps: a correct photographing format is set; the film is wound off to the frame of the image of which the photographing format was changed; the image is read again after the negative film mask is changed in accordance with the correct photographing format; image processing conditions are calculated; images are subjected to image processing under the calculated image processing conditions; the processed images are represented on the monitor for performing verification again.

Moreover, in another case where the digital photoprinter is used, it is needed to verify the images again in a way that relies on the following steps: a correct photographing format is set; image processing conditions are calculated from the image data in the region corresponding to the changed-over photographing format; the images are subjected to image processing under the thus calculated image processing conditions; and the processed images are represented on the monitor for performing verification again. Accordingly, no matter which printer, the analog photoprinter or the digital photoprinter, the processing is performed twice, which is complicated and time consuming. As a result, efficiency becomes extremely worse.

SUMMARY OF THE INVENTION

In view of the above-described problems based on the prior art, the present invention has an object to provide an image processing method capable of effectively performing image processing under image processing conditions corresponding to a correct photographing format in an apparatus which consecutively reads a plurality of images recorded on a film to detect their respective photographing formats, even when verification of photographing formats results in failure.

In order to achieve the stated object, the first aspect of the invention provides an image processing method for being applied to an analog photoprinter which performs direct, areal exposure of a light-sensitive material by projecting an image recorded on a photographic film having at least two kinds of different photographing formats in a random matter, comprising the steps of:

detecting the photographing format of the image recorded on the photographing film;

reading the image with an image sensor in accordance with the thus detected photographing format;

determining image processing conditions adaptable to the image based on the thus read image; and verifying the image subjected to image processing under the thus determined image processing conditions while it is being represented on a monitor; wherein, when the photographing format of the image can not be detected, the image processing conditions of the image corresponding to all of the photographing formats are preliminarily calculated and then stored; and wherein, after the photographing format of the image is determined while the image is being represented on the monitor, the image subjected to image processing employing the image processing conditions corresponding to the determined photographing format selected from among the image processing conditions of the image corresponding to all of the preliminarily stored photographing formats is represented on the monitor again.

It is preferable that the image processing conditions includes at least one of parameters controlling density and color balance.

It is preferable that, in case of preliminarily calculating the image processing conditions of the image corresponding to all of the photographing formats, the image is read in accordance with respective photographing formats by masking a frame in which the image is recorded.

It is preferable that in case of representing on the monitor the image the photographing format of which can not be detected, a default photographing format can be set.

It is preferable that, with reference to images recorded in all frames in the photographic film which are not limited to a case where the photographing format of the image can not be detected, image processing conditions of the image corresponding to all of the photographing formats are preliminarily calculated and stored.

It is preferable that, instead of calculating and storing the image processing conditions of the image corresponding to all of the photographing formats, individual image data obtained by subjecting the image to image processing in accordance with the image processing conditions of the image corresponding to all of the photographing formats are stored, wherein the image is represented on the monitor again employing the image data corresponding to the determined photographing format selected from among the image data obtained by subjecting the image to image processing in accordance with the image processing conditions of the image corresponding to all of the photographing formats.

The second aspect of the invention provides an image processing method for being applied to a digital photoprinter which performs digital exposure on a light-sensitive material by fine scanning at high resolution an image recorded on a photographic film having at least two different photographing formats in a random manner after prescanning the image at low resolution, comprising the steps of:

detecting the photographing format of the image recorded on the photographing film;

determining image processing conditions adaptable to the image in accordance with the thus detected photographing format based on the thus prescanned image; and verifying the image subjected to image processing under the thus determined image processing conditions while it is being represented on a monitor; wherein, when the photographing format of the image can not be detected, the image processing conditions of the image corresponding to all of the photographing formats are preliminary calculated and then stored; and wherein, after the photographing format of the image is determined while the image is being represented on the monitor, the image subjected to image processing using the image processing conditions corresponding to the determined photographing format selected from among the image processing conditions of the image corresponding to all of the preliminarily stored photographing formats is represented on the monitor again.

It is preferable that the image processing conditions includes at least one of parameters controlling density, color balance, gradation and contrast.

It is preferable that the prescanning reads the image without making a frame in which the image is recorded, and wherein the fine scanning reads in accordance with the photographing format the image by masking the frame in which the image is recorded.

In the image processing method of the first and second aspect, it is preferable that, in case of representing on the monitor the image the photographing format of which can not be detected, a default photographing format can be set.

It is preferable that, with reference to images recorded in all frames in the photographic film which are not limited to a case where the photographing format of the image can not be detected, image processing conditions of the image corresponding to all of the photographing formats are preliminary calculated and stored.

It is preferable that, instead of calculating and storing the image processing conditions of the image corresponding to all of the photographing formats, individual image data obtained by subjecting the image to image processing in accordance with the image processing conditions of the image corresponding to all of the photographing formats are stored, wherein the image is represented on the monitor again employing the image data corresponding to the determined photographing format selected from among the image data obtained by subjecting the image to image processing in accordance with the image processing conditions of the image corresponding to all of the photographing formats.

DETAILED DESCRIPTION OF THE INVENTION

An image processing method of the invention will now be described in detail with reference to the preferred embodiments shown in the accompanying drawings.

The image processing method of the invention is applicable for an analog photoprinter as well as a digital photoprinter. At first, an example of a case where the first aspect of the invention is applied to the analog photoprinter is described. Subsequently, an example of another case where the second aspect of the invention is applied to the digital photoprinter is described.

Figure 1:
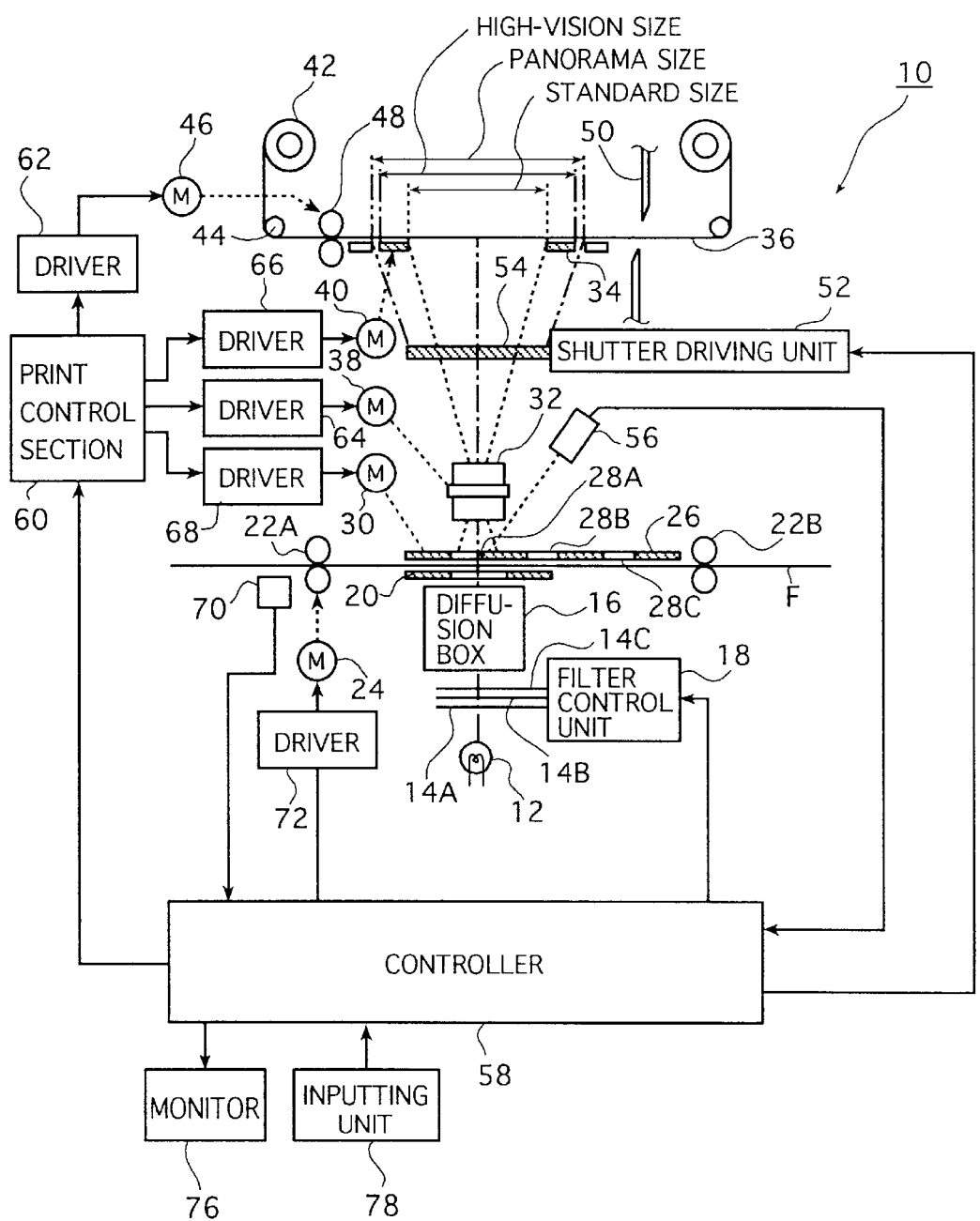
FIG. 1 is a schematic diagram showing an embodiment of an analog photoprinter applying the invention.

FIG. 1 is a schematic diagram showing an embodiment of an analog photoprinter (photographic printing apparatus) applying an image processing method of the invention.

In the analog photoprinter 10 shown in FIG. 1, printing light irradiated from a light source 12 passes through a cyan filter 14A, a magenta filter 14B and a yellow filter 14C and, thereafter, is incident on a diffusion box 16. Respective portions of those color filters 14A, 14B and 14C to be inserted into optical path are controlled by a filter control unit 18 whereby ratio and intensity of three color components of the printing light are controlled. The diffusion box 16 is composed of a rectangular cylinder whose inside surfaces are mirrors and both end faces are each provided with a diffusion plate, and sufficiently diffuses the printing light that has been subjected to color correction.

The printing light which has passed through the diffusion box 16 irradiates a negative film F on a film carrier 20 held in registry with a print position.

The negative film F is transported by transport roller pairs 22A and 22B arranged on both ends of the negative film carrier 20. The transport roller pairs 22A and 22B are connected with each other by means of a chain or the like and are rotated by a pulse motor 24. Moreover, a film mask 26 is located on the negative film F so as to keep the film F to be flat. The film mask 26 is provided with an opening 28A for the film F of standard size, an opening 28B for high-vision size and an opening 28C for panorama size, these openings being interchangeable with each other by a motor 30.

The printing light passed through the negative film F reaches color paper 36 whose exposure range is controlled by a paper mask 34 by way of a zoom lens 32 for printing and expose the color paper 36 to reproduce images on the negative film F thereon.

The zoom lens 32 is driven by a motor 38 to allow its enlargement magnification to be controlled at the time of printing. The paper mask 34 is driven by a motor 40 along the length of the color paper 36 to control the exposure range in accordance with a print size, for example, any one of the standard size (e.g. 89 mm×127 mm), the high-vision size (e.g. 89 mm×158 mm) and the panorama size (e.g. 89 mm×254 mm). The color paper 36 is drawn from a paper roll 42, passes through a guide roller 44 and reaches a pair of drawing roller pairs 48 which is driven by a pulse motor 46, where its exposed portion is cut by a cutter 50 positioned on a side of the paper mask 34 and rewound in a roll form so as to be sent to a photographic development apparatus (not shown).

A shutter 54 which is opened and closed by a shutter driving unit 52 is arranged between the zoom lens 32 and the color paper 36. Exposure is performed by opening the shutter 54 for a specified period of time.

Obliquely above the print position, a scanner 56 composed of a lens, an image sensor such as a CCD area sensor and the like, and so forth is provided to measure transmitted light at respective points of a frame set in registry with the print position. Output signals from the scanner 56 are fed to a controller 58, where characteristic quantities such as average transmitted density, minimum density and the like of each color are calculated frame by frame based on the thus fed output signals and subsequently image processing conditions, that is, exposure light quantities are calculated based on the thus calculated characteristic quantities.

The print controller 60 controls the pulse motors 46, 38 and 40 and the motor 30 by way of drivers 62, 64, 66 and 68 respectively based on the signals from the controller 58, transports the color paper 36 by a specified length and drives the zoom lens 32 and the paper mask 34 to adjust the printing magnification and the masking range.

The controller 58 controls the driving of the pulse motor 24 by way of a driver 72 based on input signals from a picture plane detection apparatus 70. To describe in detail, when a print start operation is performed, the pulse motor 24 is rotated to transport the negative film F frame by frame. In this case, driving pulse provided to the pulse motor 24 is counted by a pulse counter thereby detecting a transported position of the film F. By means of judging whether or not the counted amount reached a specified number, the frames of interest can be set in registry with the print position.

The picture plane detection apparatus 70 also detects which one of the standard size, the high-vision size and the panorama size the photographing format of the image recorded in each frame of the film F is.

Figure 2:
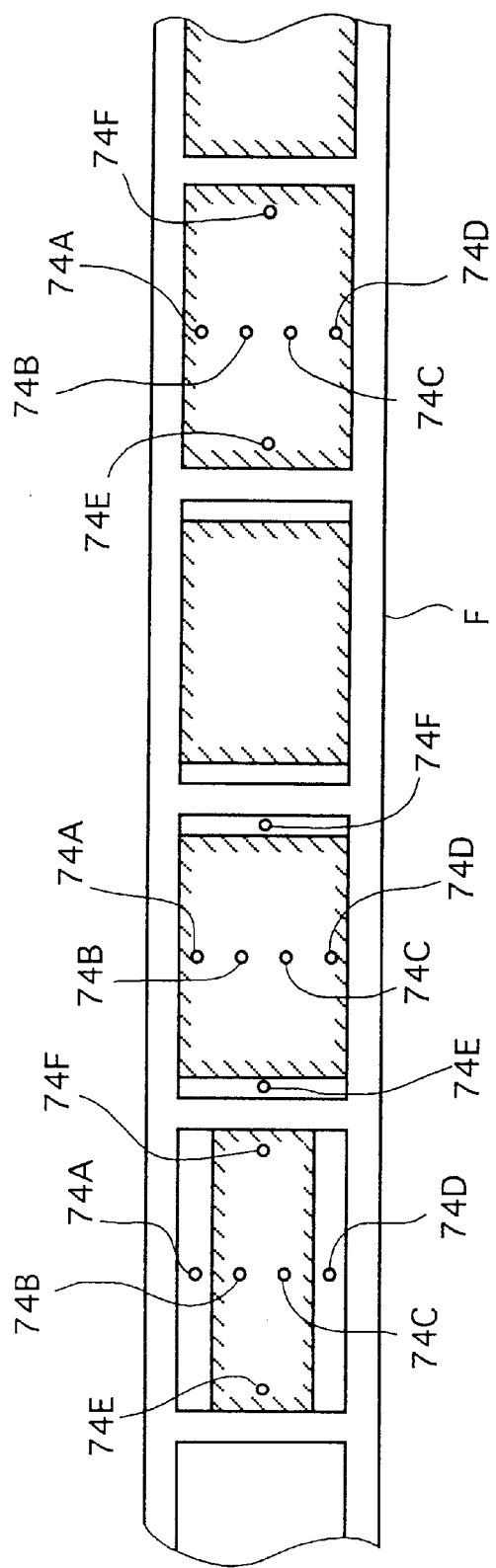
FIG. 2 is a conceptual diagram showing relative positions of respective density sensors and a film in a picture plane detection apparatus.

The picture plane detection apparatus 70, as exemplarily shown in FIG. 2 conceptually, includes six density sensors 74A, 74B, 74C, 74D, 74E and 74F which are located therein so as to take illustrated relative positions in relation with each frame when each frame has reached to a specified position in the picture plane detection apparatus 70. After, for example, density sensors 74B and 74C among these density sensors 74A to 74F detect the density of the picture plane, a pulse number provided to the pulse motor 24 as in a manner described above is counted thereby setting the frame in registry with the print position.

In the course of detection of the photographing format, just when not only the density sensors 74A to 74D detect the density which is over the specified amount but also the density sensors 74E and 74F detect the density which is below the specified amount, it is judged that the format is the standard size. And, when all of the density sensors 74A to 74F detect the density which over the specified amount, it is judged that the format is the high-vision size. Moreover, just when not only the density sensors 74B, 74C, 74E and 74F detect the density which is over the specified amount but also the density sensors 74A and 74D detect the density below the specified amount, it is judged that the format is the panorama size.

As already described, in such a detection of the photographing format, a case may appear where correct detection can not be performed depending on contents of images. For example, in an extremely under-exposure negative film recorded with fireworks or the like, the standard size may be wrongly detected as the panorama size.

In another case, the panorama size may be wrongly detected as the standard size to the contrary. In further another case where density sensors 74A to 74F fail to detect the density exceeding a specified amount, the photographing format may not be specified.

The controller 58 controls the photographic printing apparatus of interest as a whole, as well as controls the filter control unit 18 and the shutter driver 52 based on signals from the scanner 56.

Operations of the above described analog photoprinter 10, as well as the image processing method of the invention, will now be described with reference to a flowchart shown in FIG. 3.

After the negative film F is set in the film carrier 20, an operator enters a command for print preparation start in a step 200 whereup transport of the film F is started and, as a step 202, the photographing formats of images recorded in the individual frames are detected by the picture plane detection apparatus 70 in a sequential manner.

Subsequently, as a step 204, whether the photographing formats are detected or not is judged by the controller 58.

When the photographing format was able to be detected (in a case of Yes), as a step 206, any one of the opening 28A for the standard size, the opening 28B for the high-vision size and the opening 28C for the panorama size of the film mask 26 which corresponds to the detected photographing format is set at the print position whereupon the image is read by the scanner 56. The controller 58, as a step 208, calculates the image processing conditions, that is, exposure conditions based on the image data read by the scanner 26 whereby the image data are corrected imagewise (subjected to image processing) based on the thus calculated image processing conditions. Such image processing conditions preferably include at least one of parameters controlling the density and color balance.

On the other hand when it was judged at the step 204 that the photographing format was not detected (in a case of No), as a step 210, the opening 28A for the standard size, the opening 28B for the high-vision size and the opening 28C for the panorama size of the film mask 26 are interchangeably set at respective print positions one after another whereupon the images of interest are read by the scanner 56 in accordance with the respective photographing formats. The controller 58, as a step 212, calculates the image processing conditions based on the image data of the images read in accordance with respective photographing formats and stores them therein and, thereafter, corrects each image data based on such image processing conditions.

As in a way which has been described, the photographing formats of images are detected; the image processing conditions are calculated; hence, the image data corrections are performed. Thereafter, as a step 214, whether processing of a plurality of images as one whole unit of the film F has been finalized or not is judged. When it is judged that the processing has been finalized (in a case of Yes), it is allowed to proceed to a next step 216. On the other hand, in the case where the processing has not been finalized (in a case of No), it is necessitated to go back to the step 202 whereupon the image recorded in each frame is subjected to the above-described processing again.

Subsequently, at a step 216, the processed images of respective frames are represented on the monitor 76 so as to perform verification by the operator on good or bad of images which have been subjected to correction processing (image processing). In the present embodiment, the image of the frame which was judged that its photographing format was undetectable is read by the standard size, subjected to correction processing and then reported on the monitor 76. It should be noted that this is not the sole case and it is preferable to be capable of freely setting a default photographing format to be represented on the monitor 76.

Thereafter, the operator looks at a verification picture plane represented on the monitor 76 for judging whether any frame of an improper photographing format exists or not. If a frame of the improper photographing format exists, the operator enters a command for changing it into a proper photographing format by a mouse, a keyboard or the like of an inputting unit 78. In such a case, it is preferable that the image which was judged that its photographing format was unable to be detected is preferably represented as such on the monitor 76 to be easily pointed out at the step 204.

Whether the photographing format has been changed by the operator or not is judged at a step 218.

At this point, when the photographing format has not been changed by the operator (in a case of No), the image processing proceeds to a step 224.

On the other hand, when the photographing format has been changed by the operator at a step 218 (in a case of Yes), the image of the frame whose photographing format has been changed is judged at a step 220 as to whether it is the image of the frame which was judged at the step 204 that its photographing format was unable to be detected.

If it is judged at the image of the frame whose photographing format was able to be detected (in a case of No), the image processing proceeds to a step 224 which will be described later.

On the other hand, if the image of the frame whose photographing format was changed is judged at the step 220 as the image of the frame which was judged at the step 204 that the photographing format was unable to be detected (in a case of Yes), the image subjected to image processing under the image processing conditions corresponding to its photographing format specified by the operator from among the preliminary stored image processing conditions of the image of interest that correspond to all photographing formats is represented on the monitor 76.

Then, at a step 224, looking at the picture plane for verification represented on the monitor 76, the operator performs verification on good or bad of the processed image. When the verification of the images of all frames are finalized by the operator, photographic printing is started.

As has been described above, according to the image processing method of the invention, the image processing conditions corresponding to all of the photographing formats are preliminary calculated and stored for the images of the frames whose photographing formats are judged to be unable to be detected so that it is not necessary to take trouble to rewind and read the film for calculating anew the image processing conditions corresponding to the correct photographing format even in a case where the photographing format is changed to a correct one after the image has been read. This can enhance processing efficiency.

Even with reference to the image of the frame which was judged that its photographing format was able to be detected, the image processing conditions corresponding to all the photographing formats may also be preliminarily calculated and stored. This enables to instantly obtain the image processing conditions corresponding to the right photographing format at the point of time when the operator enters a command for changing formats, even if the picture plane detection apparatus 70 made a mistake in detecting the photographing format. In this case also, processing efficiency can be enhanced.

Alternatively, the image processing conditions corresponding to all the photographing formats may preliminarily be stored and, thereafter, when the correct photographing format is specified, the image may be subjected to image processing under the image processing conditions corresponding to this correct photographing format to be represented again on the monitor 76. Optionally, the image data brought about by subjecting the image to image processing under each of these image processing conditions is stored and, thereafter, when the correct photographing format is specified, the image which is stored after it has been subjected to image processing under the image processing conditions corresponding to this correct photographing format may be represented on the monitor 76.

Next, an exemplary case where the invention is applied to the digital photoprinter.

Figure 4:
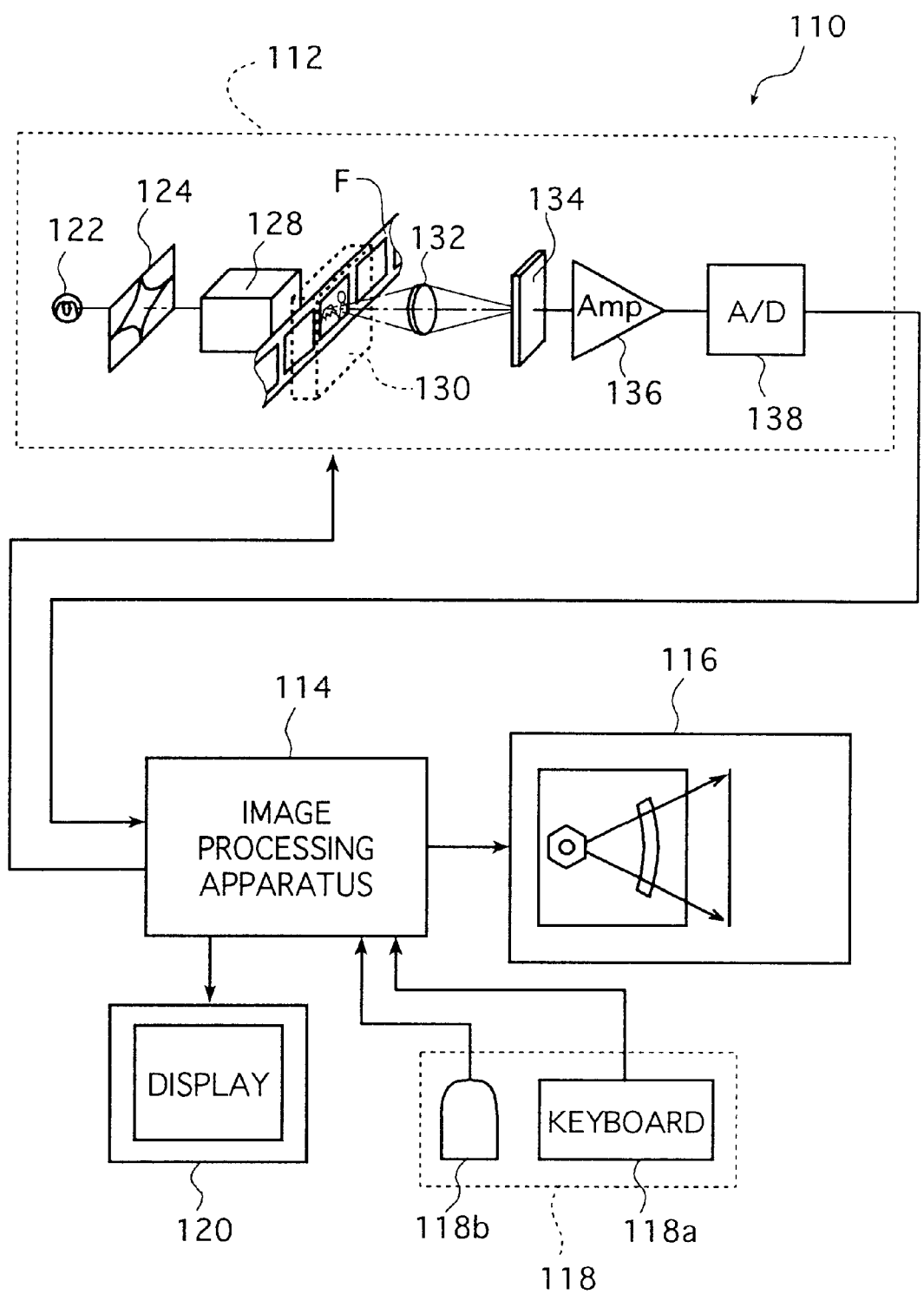
FIG. 4 is a conceptual diagram showing an embodiment of a digital photoprinter applying the invention.

FIG. 4 is a conceptual diagram showing an embodiment of a digital photoprinter carried out the image processing method of the invention. The illustrated digital photoprinter 110 is basically composed of a scanner 110 for photoelectrically reading images recorded on a film F frame by frame, an image processing apparatus 114 for controlling the digital photoprinter as a whole, as well as subjecting image data to be inputted to image processing and an image recording apparatus 116 for exposing a light-sensitive material in accordance with the processed image data as well as performing development processing.

In FIG. 4, an inputting unit 118 having a keyboard 118a, a mouse 118b and the like for inputting (setting) various conditions, selecting and commanding a specified processing step and entering a command and so forth for effecting color/density correction, and a display 120 such as a CRT (cathode ray tube), an LCD (liquid crystal display) or the like for representing the image captured with the scanner 112 or the like, various manipulative commands and picture plans for setting/registering various conditions are shown. The display 120 functions as a monitor. These inputting unit 118 and display 120 are connected to a control section (not shown) of the image processing apparatus 114.

In the digital photoprinter 110, an exemplary illustration of the scanner 112 comprises a light source 122, a variable diaphragm 124, a diffuser box 128 which diffuses reading light emitted from the light source 122 and incident on the film F so that it becomes uniform across the plane of the film F, an imaging lens unit 132, an image sensor 134 having three line CCD sensors capable of reading image corresponding to respective R (red), G(green) and B(blue), an amplifier (Amp) 136 and an A/D (analog/digital) converter 138.

Dedicated carriers 130 are provided that can be loaded into the body of the scanner 112 in accordance with the type or the size of the film used (e.g. whether it is a film of the Advanced Photo System (APS) or a negative or reversal film of 135 size), the format of the film (e.g. whether it is a strip or a slide) or other factor. By replacing one carrier 130 with another, the scanner 112 can be adapted to process various kinds of films in various modes. The images (frames) that are recorded on the film F are transported to a specified reading position by means of the carriers 130.

Figure 5A:
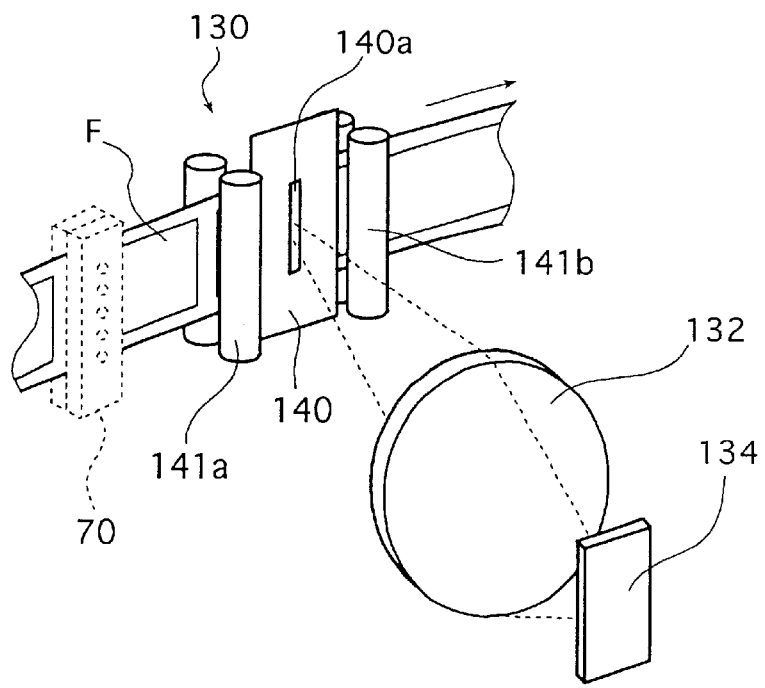
FIG. 5A is a schematic perspective view showing an embodiment of a carrier.
Figure 5B:
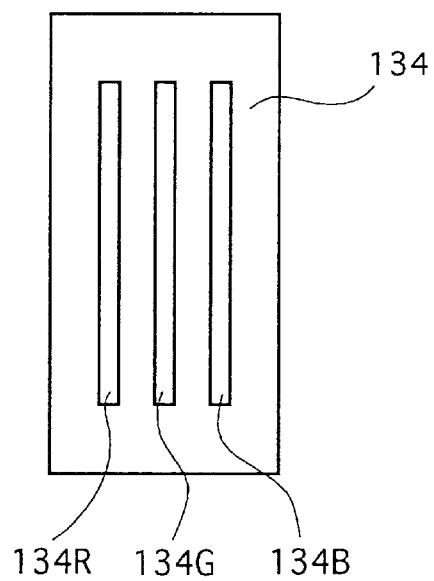
FIG. 5B is a conceptual diagram showing an embodiment of an image sensor.

FIG. 5A is a schematic perspective view showing an embodiment of a carrier. The illustrated carrier 130 which extends basically in a fine scanning direction (width direction of the film F) includes a mask 140 having a slit 140a that regulates the reading light incident on the film F and transport roller pairs 141a and 141b which are provided on opposite sides of the mask 140 respectively in an auxiliary scanning direction (longitudinal direction of the film F) and which transport the film F in the auxiliary scanning direction while holding the film F in registry with the specified reading position.

FIG. 2B is a conceptual diagram showing an embodiment of an image sensor. The illustrated image sensor 134 in the present embodiment is a 3-line color CCD sensor comprising line CCD sensors 134R, 134G and 134B for reading respective R, G and B images. Respective line CCD sensors extend in the fine scanning direction adapted to the slit 140a of the mask 140. The projected light from the film F is separated into three primary colors R, G and B and then captured photoelectrically by means of the image sensor 134.

In the scanner 112, the reading light emitted from the light source 122 has its quantity adjusted by the variable diaphragm 124, is diffused uniformly across the plane of the film F by the diffuser box 128, passes through the slit 140a of the mask 140 in the carrier 130 and is incident on the film F which is transported in the auxiliary direction by the transport roller pairs 141a and 141b. As a result, the film F is slit scanned two-dimensionally by the slit 140a which extends in the fine scanning direction.

The reading light is allowed to pass through the film F whereby the projected light bearing the image recorded on the film F is produced and then focused by the imagine lens 132 to form a sharp image on the light-receiving plane of the image sensor 134 where the projected light is separated into three primary colors R, G and B for being photoelectrically read. The image data read by the image sensor 134 is amplified with the Amp 136, converted by the A/D converter 138 into digital signals and sent to the image processing apparatus 114.

In the scanner 112, prescan which consecutively reads a plurality of images recorded on the film F at low resolution is performed and, thereafter, fine scan which consecutively reads them at high resolution is performed. In this case, photographing formats are detected based on image data captured by the prescan; reading condition and image processing condition of the fine scan are set based on the image data in regions corresponding to the thus detected respective photographing formats; the image data captured by the prescan and the fine scan are processed under the thus set respective image processing conditions.

It should be noted that the scanner 112 to be used in the digital photoprinter 110 is by no means limited to a type that relies upon the slit scan technique but that it may be of a type that relies upon areal exposure, or a technique by which the image in one frame is scanned across at a time. In this alternative approach, an area CCD sensor or the like may be used with means of inserting R, G and B color filters between the light source 122 and the film F. Image capturing with the area CCD sensor is performed with R, G and B color filters being sequentially inserted to color separate the image recorded on the film.

As already mentioned, the respective digital signals corresponding to R, G and B outputted from the scanner 112 are fed into the image processing apparatus (hereinafter called as processing apparatus) 114.

Figure 6:
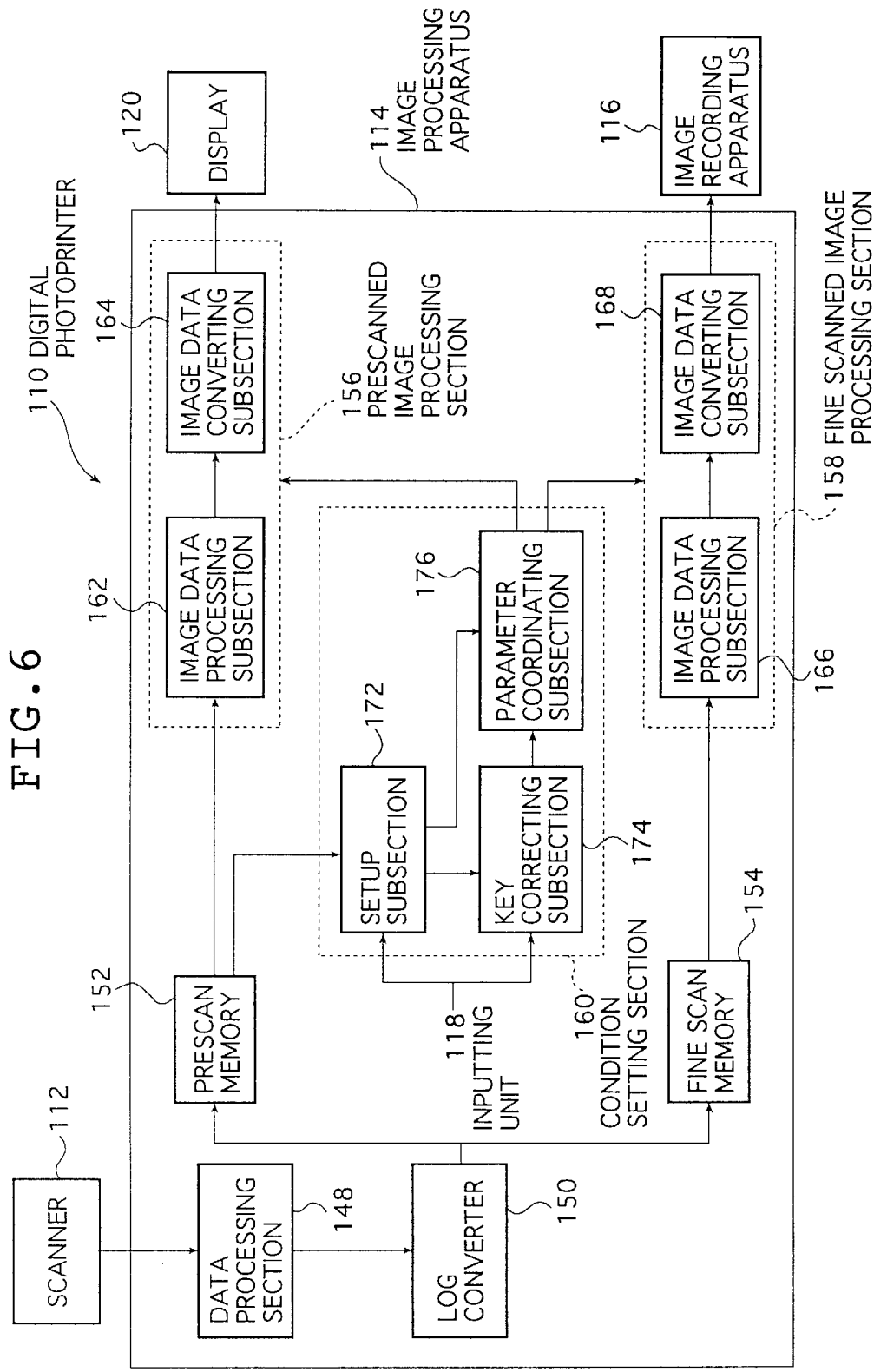
FIG. 6 is a block diagram showing an embodiment of an image processing apparatus used to the invention.

FIG. 6 is a block diagram showing an embodiment of the processing apparatus 114, which comprises a data processing section 148, a log converter 150, a prescan (frame) memory 152, a fine scan (frame) memory 154, a prescanned image processing section 156, a fine scanned image processing section 158 and a condition setting section 160.

FIG. 6 shows only the sites related to image processing for the purpose of simplicity of description and besides these sites, the processing apparatus 114 includes a control section for controlling and administering the overall operation of the digital photoprinter 110 including the processing apparatus 114 by way of an inputting unit 118 and a display 120 which are found in a personal computer or the like.

The respective R, G and B digital signals outputted from the scanner 112 to the processing apparatus 114 are sent to the data processing section 148, where they are subjected to specified data processing steps such as dark correction, defective pixel correction and shading correction. Thereafter, the processed digital signals are transferred into the log converter 150 where they are logarithmically converted into density data, of which prescanned ones are stored in the prescan memory 152 as prescanned data and fine scanned ones are stored in the fine scan memory 154 as fine scanned data.

Such prescanned data stored in the prescan memory 152 is read into the prescanned image processing section 156 to be processed therein whereas such fine scanned data stored in the fine memory 154 is read into the fine scanned image processing section 158 to be processed therein.

The prescanned image processing section 156 comprises an image data processing subsection (processing subsection) 162 and an image data converting subsection 164 whereas the fine scanned image processing section 158 comprises an image data processing subsection (processing subsection) 166 and an image data converting subsection 168.

The processing subsection 162 in the prescanned image processing section 156 and the processing subsection 166 in the fine scanned image processing section 158 are the sites where the image (image data) captured with the scanner 112 is subjected to specified image processing steps in accordance with the image processing conditions that are set by means of the condition setting section 160 which will be described later in this specification. The two processing subsections 162 and 166 perform the basically the same processing except for resolution. Image processing in the two processing subsections 162 and 166 are not limited to any specific way and various known image processing are adaptable.

The image processing steps are exemplified by gray balance adjustment, tone (gradation) correction, density (lightness) adjustment and so forth which are each performed using LUTs (look-up tables), correction for the kind of light source used in taking the picture and saturation (color) adjustment of images which are each performed by matrix (MTX), and other processing steps such as electronic magnification, dodging (compressing/extending the dynamic range of the density's dynamic range), sharpening (sharpness correction) and the like which are each performed using either any one of a low-pass filter, an adder, LUT, MTX and the like or averaging, interpolation operations and the like by means of any appropriate combinations thereof.

The image data converting subsection 164 optionally thins out the image data processed by the processing subsection 162 and converts the image data with a 3D (three dimensional)-LUT or the like into image data that corresponds to the representation on the display 120 and which is subsequently represented on the display 120. Similarly, the image data converting subsection 168 is a site where the image data processed by the processing subsection 166 is converted with the 3D (three-dimensional)-LUT or the like into image data that corresponds to image recording with the image recording apparatus 116 and which is subsequently supplied to the image recording apparatus 116.

In the processing apparatus 114, the condition setting section 160 detects the photographing formats of images photographed in the individual frames of the film F and, thereafter, sets various image processing conditions in the prescanned image processing section 156 and the fine scanned image processing section 158, the fine scan reading conditions and the like based on the prescanned data in the regions corresponding to the respective detected photographing formats. The condition setting section 160 comprises a setup subsection 172, a key correcting subsection 174 and a parameter coordinating subsection 176.

In the condition setting section 160, the setup subsection 172 detects the photographing formats of images photographed in the individual frames on the basis of the prescanned data obtained by prescanning a plurality of images recorded on the film F and, thereafter, performs construction of density histograms, calculation of image characteristic quantities of average density, highlights (the minimum density), shadows (the maximum density) and the like thereby determining the fine scan reading conditions.

Moreover, the setup subsection 172 constructs LUTs to be used for gray balance adjustment, density adjustment, tone correction or the like, constructs MTX operational formulae and calculates coefficients for sharpness correction for images photographed in the individual frames on the basis of the prescanned data in the regions corresponding to the respective photographing formats and in accordance with commands optionally entered by the operator thereby setting various image processing conditions in the prescanned image processing section 156 and the fine scanned image processing section 158.

The kind of the photographing formats and the number of the formats are by no means limited to any particular way. However, in the present embodiment, frames of images each having any one of three kinds of photographing formats, that is, the standard size, the high-vision size and the panorama size, are present in a film in a random way for the purpose of easy comparison. In this case, automatic detection of the photographing formats may not always be correctly performed as is the same case with the analog photoprinter.

Moreover, in the present embodiment, the photographing format of each fame is detected from the prescanned data, after images recorded in one unit of the film were consecutively scanned. However, the invention is not limited to this method and every time the image in a frame is prescanned, the photographing format of the image may also be detected frame by frame in a sequential manner. As an alternative example, scanning can be consecutively performed only on images in as many frames as possible that can be represented on the monitor for image verification instead of images recorded in one unit of the film.

Furthermore, in the present embodiment, the photographing format is detected from the prescanned data. However, the invention is not limited to this method and the picture plane detection apparatus 70 may be provided in the scanner 112 of the illustrated digital photo printer (see FIG. 5A) as is the same case with the analog photoprinter 10 to detect the photographing format of each image.

Moreover, the image processing conditions preferably includes at least one of parameters controlling density, color balance, tone (gradation) and contrast.

Subsequently, the key correcting subsection 174 calculates the amounts of adjustment of image processing conditions in accordance with various commands entered from the inputting unit 118 by means of keys, the mouse 118b or the like that has been set in the keyboard 118a for adjusting the density (brightness), color, contrast, sharpness, saturation and so forth; the key correcting subsection 174 then supplies the calculated amounts of adjustment into the parameter coordinating subsection 176.

After receiving the image processing conditions that have been set by the setup subsection 172, the parameter coordinating subsection 176 sets them in the prescanned image processing section 156 and the fine scanned image processing section 158. Further, in accordance with the amounts of adjustment calculated by the key correcting subsection 174, the parameter coordinating subsection 76 either corrects (adjusts) the image processing conditions set in various parts or makes another setting of image processing conditions.

Figure 7:
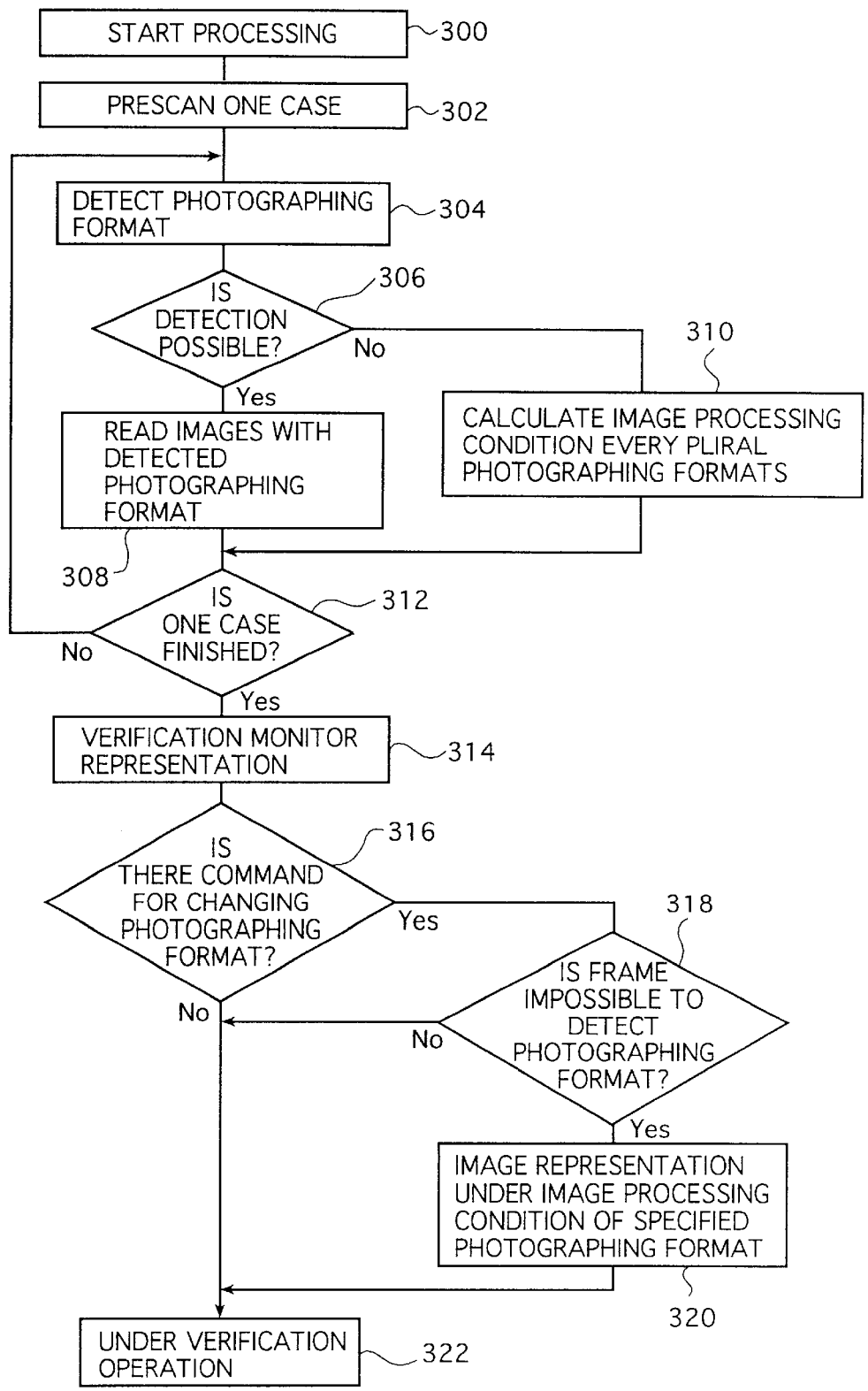
FIG. 7 is a flowchart showing another embodiment of respective steps of the image processing method of the invention.

We now briefly describe the operations of the digital photoprinter 110 as well as the image processing method of the invention with reference to the flowchart shown in FIG. 7.

When a command for starting print preparation is keyed in at a step 300, one unit (case) of images recorded on the film F are, first of all, consecutively prescanned by the scanner 112 as a step 302 and then separated into R, G and B to be read photoelectrically. Digital signals corresponding to R, G and B issued from the scanner 112 is fed into the processing apparatus 114, subjected to the specified data processing such as shading correction and so forth and converted logarithmically into density data to be stored in the prescan memory 152.

Thereafter, the prescanned data is read from the prescan memory 152 and fed into the setup subsection 172 of the condition setting section 160 and the processing subsection 162 of the prescanned image processing section 156.

In the setup subsection 172, the photographing format corresponding to each of images is detected based on the prescanned data as a step 304 and, then, whether the photographing format is detected or not is judged as a step 306.

At this point, if the photographing format was able to be detected (in a case of Yes), image processing conditions are calculated as a step 308 based on the prescanned data in the region corresponding to the detected photographing format.

On the other hand, if the judgement results in that the photographing format was unable to be detected (in a case of No), image processing conditions corresponding to respective photographing formats of the image of interest are calculated based on the prescanned data in the regions corresponding to respective photographing formats at a step 310 and, then, image processing conditions corresponding to all of the photographing formats are stored.

Following the way which has been described above, the photographing format of the image is detected; the image processing conditions are calculated; image data correction (image processing) is performed. Thereafter, as a step 312, a plurality of images in one unit of the film F are judged whether the above processing steps have been finalized. If the processing steps have been finalized (in a case of Yes), it is allowed to proceed to the next step 314. On the other hand, if the processing steps have not been finalized (in a case of No), it is necessitated to got back to the step 304 and the images recorded in respective frames are subjected to the above-described processing again.

Figure 3:
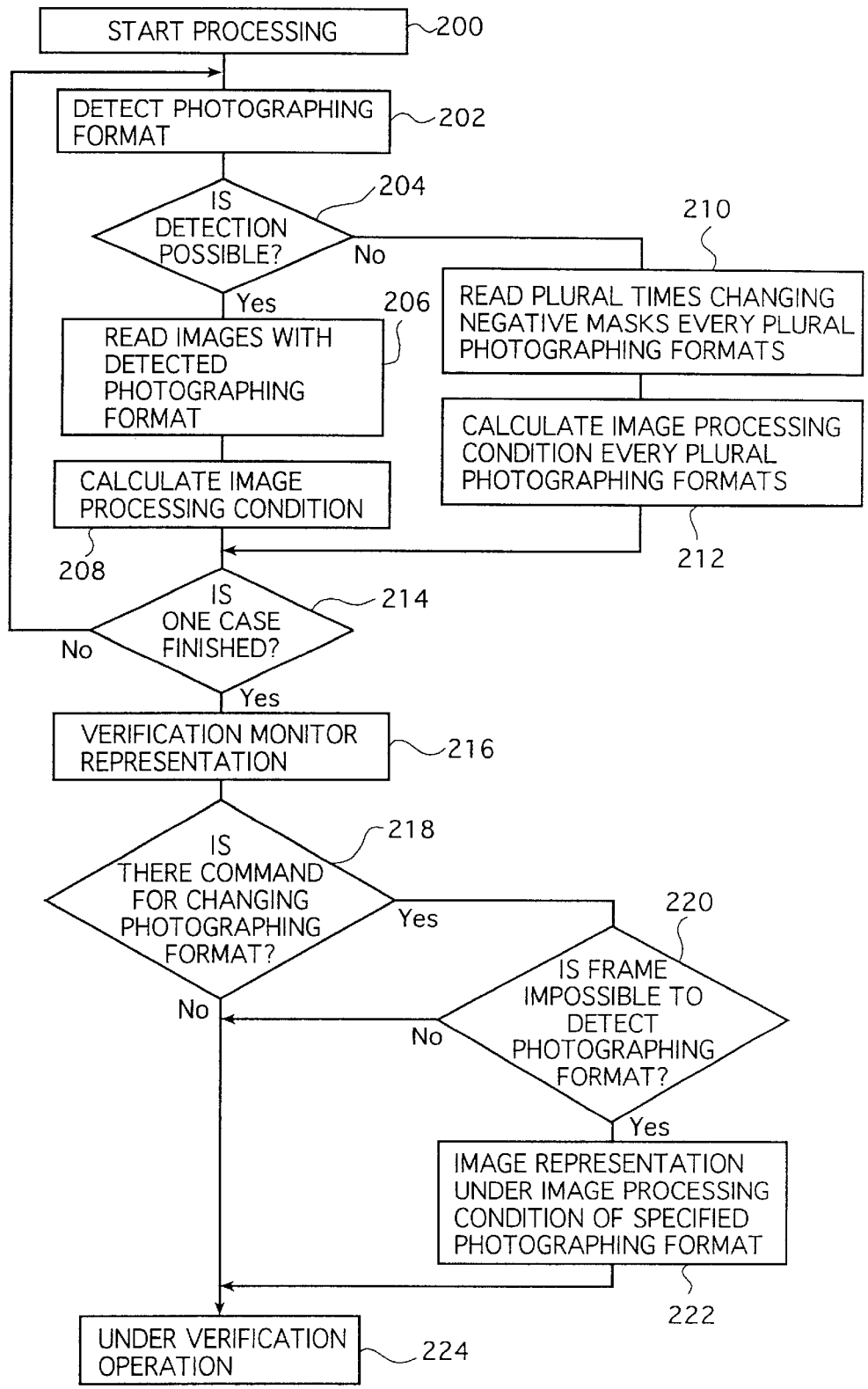
FIG. 3 is a flowchart showing an embodiment of respective steps in a image processing method of the invention.

With regard to subsequent operations, steps 314, 316, 318, 320 and a 322 shown in the flowchart of FIG. 7 correspond to steps 216, 218, 220, 222 and 224 shown in the flowchart of FIG. 3 respectively and also these subsequent operations are the same as corresponding operations at the analog photoprinter 10. Therefore, detailed description is omitted.

Namely, at a step 322, the image subjected to image processing based on the image processing conditions corresponding to the photographing format is represented on the monitor 120.

As described above, according to the image processing method of the invention, the image processing conditions corresponding to all of the photographing formats are preliminarily calculated and stored for the images of the frames whose photographing formats are judged to be unable to be detected so that it is not necessary to take trouble to calculate anew the image processing conditions corresponding to the correct photographing format even in a case where the photographing format is changed to a correct one after the image has been read. This can enhance processing efficiency.

Subsequently, in the setup subsection 172, construction of density histograms of the image, calculation of characteristic quantities of the image and so forth are performed based on the prescanned data in the region corresponding to the photographing format; the fine scan reading conditions such as stop-down control value of the variable diaphragm 124 and the like are determined; the image processing conditions (exposure condition) at each of the processing subsections 162 and 166 are determined in accordance with density histograms, image characteristic quantities and the like. The parameter coordinating subsection 176 sets the image processing conditions at each of the specified sites of the prescanned image processing section 156 and the fine scanned image processing section 158.

Thereafter, verification is optionally performed by the operator. As described above, the prescanned data is processed in the processing subsection 162 and subsequently the thus processed data is converted in the image data converting subsection 164 to an image data that corresponds to representation. Then, the thus converted image data is represented on the display 120 as a simulated image.

Looking at the representation on the display 120, the operator checks (verifies) the image, or the result of the processing and, if necessary, manipulates the aforementioned keys or the like provided on the keyboard 118a to adjust the color, density, gradation and other features of the image.

The inputs for this adjustment are sent to the key correcting subsection 174 which, in response to the entered inputs for adjustment, calculates the amounts of correction of the image processing conditions and sends them to the parameter coordinating subsection 176. In response to the amounts of correction supplied from the key correcting subsection 174, the parameter coordinating subsection 176 corrects the LUTs, MTXs and other conditions in the processing subsections 162 and 166 as already described above. The image represented on the display 120 also varies in response to this corrective measure, or the inputs for adjustment entered by the operator.

If the operator concludes that the image in the frame of interest represented on the display 120 is appropriate (verification OK), the operator manipulates the keyboard 118a or the mouse 118b to give a command for print start, whereupon the image processing conditions are finalized. As a result, the fine scan reading condition are set in the scanner 112, whereby fine scan gets started. If no image verification is to be performed, the image processing conditions are finalized at the point of time when the parameter coordinating subsection 176 ends setting of the image processing condition in the fine scanned image processing section 158, and the fine scan gets started.

Fine scan is performed in essentially the same manner as prescan except that the reading conditions are those for fine scan. The fine scanned data is stored in the fine scan memory 154.

Thereafter, the fine scanned data is read from the fine scan memory 154 and supplied to the processing subsection 166 of the fine scanned image processing section 158, where the fine scanned data is processed under the finalized image processing conditions and subsequently converted to output image data in the image data converting subsection 168 before it is sent to the image recording apparatus 116.

The image recording apparatus 116 is essentially the combination of a printer (exposing device) that records a latent image on a light-sensitive material (photographic paper) by exposing it in accordance with the supplied image data and a processor (developing device) that performs specified processing steps on the exposed light-sensitive material and which outputs it as a print.

To give one example of the printer's operation, the light-sensitive material is cut to a specified length in accordance with the size of the final print; thereafter, the printer records a back print and three light beams for exposure to red (R), green (G) and blue (B) in accordance with the spectral sensitivity characteristics of the light-sensitive material are modulated in accordance with the image data outputted from the processing apparatus 114; the three modulated light beams are deflected in the main scanning direction while, at the same time, the light-sensitive material is transported in the auxiliary scanning direction perpendicular to the main scanning direction so as to record a latent image by two-dimensional scan exposure with the light beams. The latent image bearing light-sensitive material is then supplied to the processor.

Receiving the light-sensitive material, the processor performs a wet development process comprising color development, bleach-fixing and rinsing; the thus processed light-sensitive material is dried to produce a finished print; a plurality of prints thus produced are sorted and stacked in specified units, say, one roll of film.

While the image processing method of the present invention has been described above in detail, it should be noted that the invention is by no means limited to the foregoing embodiments and various improvements and modifications may of course be made without departing from the scope and spirit of the invention.

As described above in detail, according to the image processing method of the present invention, in the case where the photographing format is unable to be detected, the image processing conditions of the image of interest corresponding to all of the photographing formats are preliminarily calculated and then stored; the photographing format of the image of interest is determined while the image of interest is being represented on the monitor; thereafter, the image subjected to image processing using the image processing conditions corresponding to the thus determined photographing format selected from among the preliminarily stored image processing conditions of the image of interest corresponding to all of the photographing formats is represented on the monitor again.

As a result, according to the image processing method of the invention, even when the detection of the photographing format results in failure, the image can be efficiently processed under the image processing conditions corresponding to the correct photographing format thereby being capable of enhancing the productivity of the apparatus.

What is claimed is:

1. An image processing method for being applied to an analog photoprinter which performs direct, areal exposure on a light-sensitive material by projecting an image recorded on a photographic film having at least two kinds of different photographing formats in a random manner, comprising the steps of:

detecting the photographing format of said image recorded on said photographing film;

reading said image with an image sensor in accordance with the thus detected photographing format;

determining image processing conditions adaptable to said image based on the thus read image; and verifying said image subjected to image processing under the thus determined image processing conditions while it is being represented on a monitor; wherein, when the photographing format of said image can not be detected, the image processing conditions of said image corresponding to all of the photographing formats are preliminarily calculated and then stored; and wherein, after the photographing format of said image is determined while said image is being represented on the monitor, said image subjected to image processing employing the image processing conditions corresponding to said determined photographing format selected from among the image processing conditions of said image corresponding to all of said preliminarily stored photographing formats is represented on the monitor again.

2. The image processing method according to claim 1, wherein said image processing conditions includes at least one of parameters controlling density and color balance.

3. The image processing method according to claim 1, wherein, in case of preliminarily calculating the image processing conditions of said image corresponding to all of said photographing formats, said image is read in accordance with respective photographing formats by masking a frame in which said image is recorded.

4. The image processing method according to claim 1, wherein, in case of representing on said monitor said image said photographing format of which can not be detected, a default photographing format can be set.

5. The image processing method according to claim 1, wherein, with reference to images recorded in all frames in said photographing film which are not limited to a case where the photographing format of said image can not be detected, image processing conditions of said image corresponding to all of the photographing formats are preliminarily calculated and stored.

6. The image processing method according to claim 1, wherein, instead of calculating and storing the image processing conditions of said image corresponding to all of said photographing formats, individual image data obtained by subjecting said image to image processing in accordance with the image processing conditions of said image corresponding to all of said photographing formats are stored, wherein said image is represented on the monitor again employing the image data corresponding to said determined photographing format selected from among the image data obtained by subjecting said image to image processing in accordance with the image processing conditions of said image corresponding to all of said photographing formats.

7. An image processing method for being applied to a digital photoprinter which performs digital exposure on a light-sensitive material by fine scanning at high resolution an image recorded on a photographic film having at least two different photographing formats in a random manner after prescanning said image at low resolution, comprising the steps of:

detecting the photographing format of said image recorded on said photographing film;

determining image processing conditions adaptable to said image in accordance with the thus detected photographing format based on the thus prescanned image; and verifying said image subjected to image processing under the thus determined image processing conditions while it is being represented on a monitor; wherein, when the photographing format of said image can not be detected, the image processing conditions of said image corresponding to all of the photographing formats are preliminarily calculated and then stored; and wherein, after the photographing format of said image is determined while said image is being represented on the monitor, said image subjected to image processing using the image processing conditions corresponding to said determined photographing format selected from among the image processing conditions of the image corresponding to all of said preliminarily stored photographing formats is represented on the monitor again.

8. The image processing method according to claim 7, wherein said image processing conditions includes at least one of parameters controlling density, color balance, gradation and contrast.

9. The image processing method according to claim 7, wherein said prescanning reads said image without masking a frame in which said image is recorded, and wherein said fine scanning reads in accordance with said photographing format said image by masking the frame in which said image is recorded.

10. The image processing method according to claim 7, wherein, in case of representing on said monitor said image said photographing format of which can not be detected, a default photographing format can be set.

11. The image processing method according to claim 7, wherein, with reference to images recorded in all frames in said photographic film which are not limited to a case where the photographing format of said image can not be detected, image processing conditions of said image corresponding to all of the photographing formats are preliminarily calculated and stored.

12. The image processing method according to claim 7, wherein, instead of calculating and storing the image processing conditions of said image corresponding to all of said photographing formats, individual image data obtained by subjecting said image to image processing in accordance with the image processing conditions of said image corresponding to all of said photographing formats are stored, wherein said image is represented on the monitor again employing the image data corresponding to said determined photographing format selected from among the image data obtained by subjecting said image to image processing in accordance with the image processing conditions of said image corresponding to all of said photographing formats.

* * * * *